(12) United States Patent
Zhang

(10) Patent No.: US 9,218,274 B2
(45) Date of Patent: Dec. 22, 2015

(54) AUTOMATED FORM TESTING

(71) Applicant: NEOPOST TECHNOLOGIES, Bagneux (FR)

(72) Inventor: Jie Zhang, Issaquah, WA (US)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 14/160,647

(22) Filed: Jan. 22, 2014

(65) Prior Publication Data

US 2015/0205710 A1   Jul. 23, 2015

(51) Int. Cl.
*G06F 9/44*   (2006.01)
*G06F 11/36*   (2006.01)

(52) U.S. Cl.
CPC .................................. *G06F 11/3692* (2013.01)

(58) Field of Classification Search
None
See application file for complete search history.

(56) References Cited

U.S. PATENT DOCUMENTS

| | | | |
|---|---|---|---|
| 7,296,184 B2 | 11/2007 | Derks et al. | |
| 7,715,045 B2 | 5/2010 | Sussmeier et al. | |
| 2003/0101041 A1* | 5/2003 | Gabele et al. | 703/22 |
| 2005/0188357 A1* | 8/2005 | Derks et al. | 717/124 |
| 2006/0122818 A1* | 6/2006 | Behm et al. | 703/17 |
| 2008/0040162 A1 | 2/2008 | Brice et al. | |
| 2011/0231823 A1 | 9/2011 | Fryc et al. | |
| 2011/0276946 A1* | 11/2011 | Pletter | 717/124 |
| 2013/0110279 A1* | 5/2013 | Dunsker et al. | 700/214 |
| 2013/0174011 A1* | 7/2013 | Le Chevalier et al. | 715/234 |
| 2013/0185632 A1 | 7/2013 | Damera-Venkata | |
| 2013/0205199 A1 | 8/2013 | Damera-Venkata | |

FOREIGN PATENT DOCUMENTS

| | | |
|---|---|---|
| EP | 0814425 | 12/1997 |
| WO | 2007084760 A2 | 7/2007 |

OTHER PUBLICATIONS

Extended European Search Report for European application 15305066.1, mailed Sep. 8, 2015.
Barnett, "Testing Electronic Forms", 2002, pp. 1-22, XP002610012, Retrieved from the Internet: URL:http://www.rbainformationdesign.com.au/downloads/TESTEF.pdf [retrieved on Nov. 17, 2010]section "Testing graphics", pp. 7-8.

\* cited by examiner

*Primary Examiner* — Don Wong
*Assistant Examiner* — Daxin Wu
(74) *Attorney, Agent, or Firm* — Morris & Kamlay LLP

(57) ABSTRACT

Systems and techniques are provided that allow for comparison of an automatically-generated form to an original form to identify discrepancies efficiently. Portions of the form, such as those expected to contain dynamic data, may be masked, allowing for more efficient and accurate comparison with a predicted form and an actual output form. Further, testing of the form may be automated, allowing for more accurate and efficient generation of each form considered.

16 Claims, 3 Drawing Sheets

FIG. 2

| A. Software | | |
|---|---|---|
| CASS A1 | 1. CASS Certified Company Name | 2. CASS Certified Software Name & Version |
| | 4. Z4Change Certified Company Name | 5. Z4Change Certified Software Name & Version |
| | 7. DirectDPV™ Certified Company Name | 8. DirectDPV Certified Software Name & Version |
| | 10. eLOT® Certified Company Name | 11. eLOT Certified Software Name & Version |
| MASS A2 | 1. MASS™ Certified Company Name | 2. MASS Certified Software Name, Version & Model No. |

| A. Software | | |
|---|---|---|
| CASS A1 | 1. CASS Certified Company Name | 2. CASS Certified Software Name & Version |
| | 4. Z4Change Certified Company Name | 5. Z4Change Certified Software Name & Version |
| | 7. DirectDPV™ Certified Company Name | 8. DirectDPV Certified Software Name & Version |
| | 10. eLOT® Certified Company Name | 11. eLOT Certified Software Name & Version |
| MASS A2 | 1. MASS™ Certified Company Name | 2. MASS Certified Software Name, Version & Model No. |

FIG. 4

| | | |
|---|---|---|
| A. Software | | |
| CASS A1 | 1. CASS Certified Company Name 405 | 2. CASS Certified Software Name & Version |
| | 4. Z4Change Certified Company Name 410 | 5. Z4Change Certified Software Name & Version |
| | 7. DirectDPV™ Certified Company Name 415 | 8. DirectDPV Certified Software Name & Version |
| | 10. aLOT* Certified Company Name 420 | 11. aLOT Certified Software Name & Version |
| MASS A2 | 1. MASS™ Certified Company Name | 2. MASS Certified Software Name, Version & Model No. |

FIG. 5

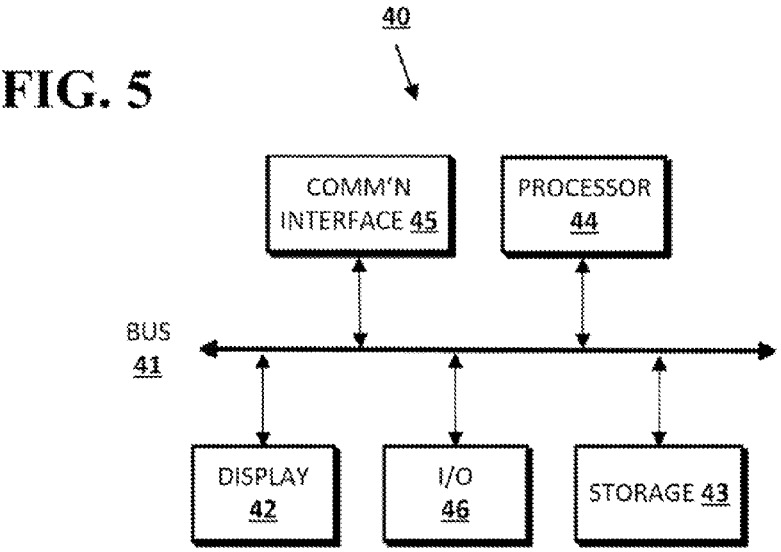

AUTOMATED FORM TESTING

BACKGROUND

Some guidelines and regulations, such as postal regulations, require that electronic forms, such as USPS Form #3553, have specific layouts and static content. Current software applications often create finalized forms by merging dynamic content by into form templates. In some instances, if the software application is not properly designed, merging of the dynamic content may affect the layout and/or static content of the finalized form in an undesirable manner. For example, specific fields and/or static content may be displaced from their intended location, such as where an unexpectedly long portion of dynamic content causes text areas and static content to become displaced from its required or intended location.

Testing of a software application with regard to finalized forms creation often is performed by comparing an actual result with a predicted outcome to confirm that the forms generated by the software application comply with the layout and static content requirements. Conventional testing methods often involve manual testing, such as human observation that layout and static content of an actual result of a finalized form remain in the same relative location for each of many finalized forms.

BRIEF SUMMARY

Embodiments of the invention provide systems and techniques for testing an automatically-generated form. In an embodiment, an original representation of a form may be obtained. A predicted result representation of the form may then be generated, which includes a mask that masks a region of the form. An actual output representation of the form also may be generated by a system configured to automatically generate a version of the form or otherwise obtain such a version. The predicted result representation of the form may then be compared to the actual output representation of the form, excluding each masked region. Based upon the comparison, an identification of an inconsistency, if any, between the predicted result representation and the actual output representation of the form may be provided.

Systems and techniques disclosed herein may allow for automatically-generated forms to be efficiently and accurately tested and modified. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 2 shows an example of an original form as disclosed herein.

FIG. 3 shows an example of an automatically-generated version of the form shown in FIG. 2.

FIG. 4 shows an example of the predicted output form shown in FIG. 2 with a mask applied according to an embodiment of the invention.

FIG. 5 shows an example computer system suitable for use with embodiments of the invention.

DETAILED DESCRIPTION

Figure 1:
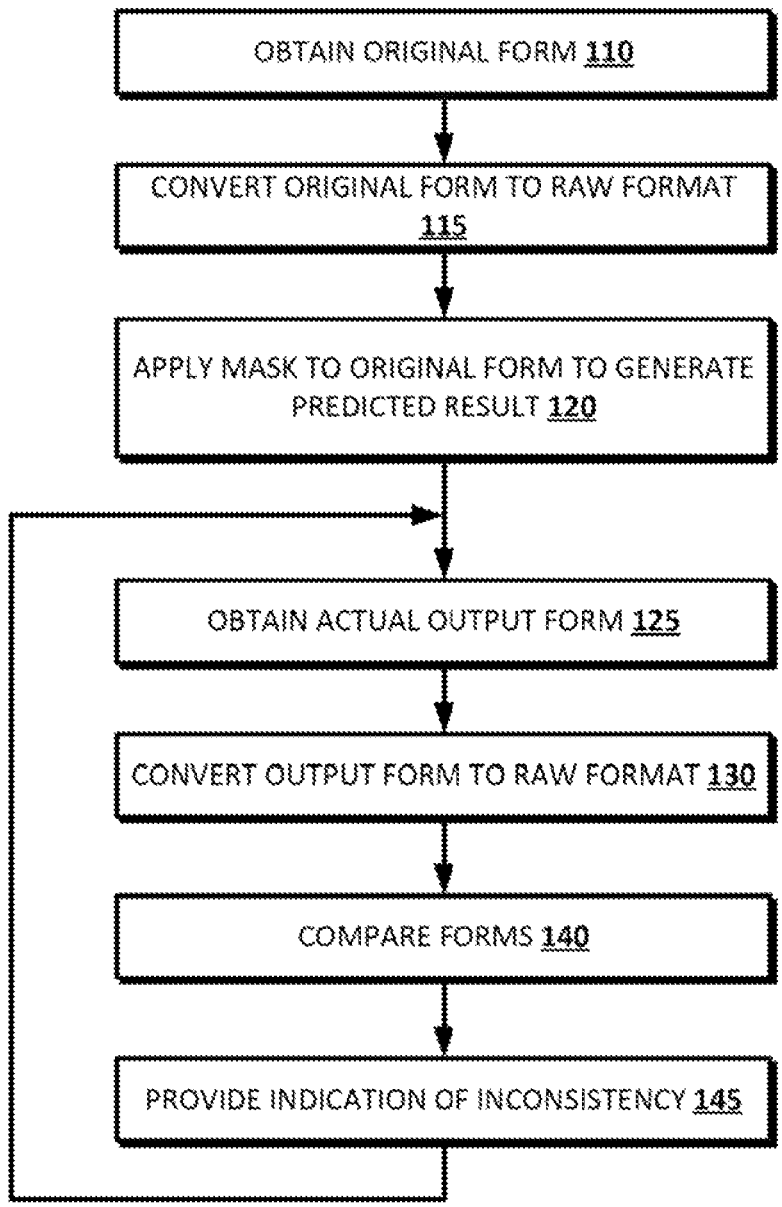
FIG. 1 shows an example process for generating and testing an automatically created form according to an embodiment of the invention.

Manual testing of automated forms typically is time and resource intensive. While it is desirable to automate testing of finalized forms, obstacles can interfere with automated finalized form testing. In some cases, form templates include fields with dynamic content, such as a date and time when the finalized form is generated, for example. Inclusion of such dynamic content increases a difficulty associated with creating the predicted outcome in advance of generating the actual result of the finalized form. Furthermore, while it may be straightforward to extract static text from a native format of the finalized form, it may be difficult to extract the layout of the finalized form. Without being able to extract the layout, automated testing cannot be performed.

Notably, many common and/or native formats are used for automatically-generated forms because they provide readily for convenient, flexible, and easily-merged data to create a finalized form. However, such native formats typically employ various types of data elements. Some of these various data elements, such as the layout elements, for example, may not be easily quantifiable with regard to their size and/or location, and therefore may not be readily comparable between a predicted form and actual finalized form. Thus, it may be difficult to compare the output of an automatic form generation system to the format required for the form to be used or accepted in a specific context.

Embodiments of the present invention address these issues by providing systems and techniques to allow for automated testing of automatically-generated forms. In an embodiment, a finalized form is converted to a raw image representation, such as a bitmap. Other formats in addition to, or instead of, a bitmap format may be used. More generally, a raw representation format includes any format that allows for rapid comparison of two items represented in the format, such as for pixel-by-pixel comparison. Sections of a raw representation that are not fields or static content of a form may be masked or otherwise ignored, to allow for more accurate and/or efficient comparison with expected form arrangements.

FIG. 1 shows an example process for generating and testing an automatically created form according to an embodiment of the invention. At 110, an original representation of an actual form result may be obtained. For example, the original representation may be provided by an entity such as a regulatory authority, corporate entity, or the like. Original representations may be provided in a native or original format such as PDF. At 115, the original representation may be converted to a raw format, such as a bitmap. Alternatively, a raw representation may be created directly, such as based upon guidelines or requirements of a regulation, a sample or reference form or template, or other source of a form definition. Specific examples of a reference form are provided in further detail below. At 120, a mask may be applied to the raw representation to generate a predicted result form. For example, a bitmap of the form including the mask may be generated, such as by converting from an original or native format such as PDF, to a raw image format such as a bitmap. Alternatively or in addition, a mask may be applied to the raw representation of the original form. The mask may be applied to various parts of the predicted result form, such as portions of the form that contain or are designated to contain dynamic content. The mask may include one or more sections that cover or replace the selected portions of the form. For example, the mask may include several rectangular regions that are filled with a selected color. As another example, the mask may define areas of the form that are to be ignored when performing an accuracy comparison as described in further detail below. Thus, a mask as described herein may or may not be human-visible on the form when the form layout is being tested as disclosed herein. The predicted result form also may be generated inclusive of the mask initially, instead of applying the mask after generating the predicted result form and separately applying the mask.

An actual output of the automated form may then be generated at 125. The specific output to be used may be selected by a human, by an automated process, or the like. The actual output form may be generated using the same process that ultimately will be used to generate complete forms using arbitrary dynamic content. For example, where a system is designed to generate shipping labels using dynamic information such as sender and recipient addresses, a set of representative sender and recipient addresses may be selected to generate the actual output form. In some cases, specific data may be selected automatically or by hand to test specific cases, such as where a particularly long last name is selected to test layout of a "recipient name" field on the form.

At 130, the selected output form may be converted to a raw format, such as a bitmap. Alternatively, the form output may be generated directly in the raw format instead of first being generated in an intermediate format, which typically is the format that will be used for the completed forms outside of the form testing context.

At 140, the masked predicted result form is compared to the actual output form. Masked areas are trivially identified as being the same, or are not compared. For example, if a visual mask is used to identify a part of the forms that are not to be compared, a comparison may always return an exact match. As a specific example, if both forms are in a bitmap format, the mask may include rectangular areas of a specific pre-defined color in specific locations that are the same for each form. When the forms are compared, these regions will necessarily show as exact matches. Thus, only non-masked portions of the forms may be identified as non-matches between the forms. Alternatively or in addition, each masked portion may not be compared. For example, the region or regions defined by the mask may be omitted entirely from any comparison between the forms. Notably, the conversion of forms to a format such as bitmap, which allows the insertion of fixed, address and value-assigned visual elements to the forms. This then allows for a pixel-by-pixel comparison of the converted actual form to the masked predicted form result.

At 145, an identification of one or more inconsistencies between the predicted result form and the actual output form may be provided, such as to a user of the system. For example, visible regions where boundaries, text, graphics, or other components of the forms did not align may be provided. The identification may include a visual representation of the form with the inconsistent area highlighted, such as by outlining or other visual cues. It also may include a text or other description of the inconsistency. Alternatively, if no inconsistencies are found, an indication that the forms are not inconsistent may be provided. A threshold may be set to define what is considered an inconsistency. For example, although embodiments disclosed herein typically may perform pixel-by-pixel comparisons and thus may be able to identify discrepancies as small as a single pixel, in some cases there may be no need for a form to be modified unless the inconsistency is visible at a certain distance, resolution, scale, output form (e.g., print vs. electronic), or the like. Thus, unless the inconsistency is higher than the threshold, it may not be identified at 145. For example, if a hard copy of the form is ultimately to be provided as a final output and differences less than 3 pixels will not be visually apparent in the final output, inconsistencies of 1 or 2 pixels may not be identified. The process then may be repeated as disclosed herein, such as by altering the process used to generate the actual output form and subsequently repeating some or all of steps 125-145, and/or other steps disclosed herein.

Notably, many common and/or native formats such as PDF do not allow for creation or addition of a mask as described in here, such as to hide otherwise unpredictable dynamic content. This inability is addressed as disclosed herein by using an intermediate format such as a bitmap format. Specifically, by converting the original representation of an actual result to such a format, the layout information may be preserved in a manner that is amenable to a pixel-by-pixel comparison, thus allowing for automated comparison of an expected form with an actual output form. Thus, embodiments disclosed herein may allow for comparison testing of a finalized form including fields with static content and dynamic content. That is, the effect of the dynamic content upon the fields and static content is also tested as a result of the transformations and comparison techniques disclosed herein. Further, in some embodiments the process or system that generates the actual output form may be automatically modified to address an inconsistency identified during the comparison process disclosed herein. For example, a comparison may identify an inconsistency in the placement of a graphic element of the form, and may determine that the inconsistency includes a shift up and to the right relative to the original form. A system that generates the form may be automatically modified to place the graphic element down and to the left relative to its placement in an earlier version of the automatically-generated form, thus moving the element closer to the correct location. After such a modification, whether performed automatically or otherwise, the form generation and comparison techniques previously described also may be repeated to determine if the same inconsistency is present, whether a new inconsistency has been introduced, or the like.

FIG. 2 shows an example of an original form. The form may be provided initially in a native or original format, such as PDF, and may be converted as disclosed herein to a raw format such as a bitmap. The bitmap representation may visually appear identical or essentially identical to the original format. The form shown in FIG. 2 is a portion of the U.S. Postal Service's Form 3553 for ease of illustration; however, it will be readily understood by one of skill in the art that any suitable form may be used. Forms that may be generated procedurally and automatically while still complying with regulatory, internal, or other requirements for use of the form may be particularly suited for use with the present invention, though any form that may be processed as disclosed herein also may be used.

FIG. 3 shows an example of an automatically-generated version of the form shown in FIG. 2, in which a layout element is placed inconsistently relative to the original form. As shown, the dividing line 310 is offset from other lines with which it is aligned in the original form, and thus is considered inconsistent. Such a mis-alignment may occur, for example, when a system that generates the version of the form as shown in FIG. 3 improperly allocates space for dynamic content such as the "Company Name" field, due to an error in placement during development of the form generation routine or system, or the like.

FIG. 4 shows an example of the predicted output form shown in FIG. 2 with a mask applied. Regions 405, 410, 415, and 420 are covered by the mask and, therefore, will not be compared to an actual result form generated from the original form shown in FIG. 3. Notably, although a portion 405 of the mask covers part of the mis-aligned dividing line, the inconsistency will still be noted upon comparison to the predicted result form because the predicted result form will include the original dividing line, which is absent from the original location in the actual result form shown in FIG. 3.

Various embodiments may include or be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the invention. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the method in accordance with the present invention in hardware and/or firmware. The processor may be coupled to memory, such as RAM, ROM, flash memory, a hard disk or any other device capable of storing electronic information. The memory may store instructions adapted to be executed by the processor to perform the method in accordance with an embodiment of the present invention.

FIG. 5 shows a schematic representation of an example computer 40 suitable for implementing embodiments of the invention. The computer 40 includes a bus 41 which connects major components of the computer 20, such as a processor 44, one or more memory and/or storage components 43 such as RAM, ROM, flash RAM, hard drive, flash drive, network-attached storage interface, or the like, user input/output components such as an I/O controller, keyboard, touchscreen, or the like, an a communication interface 45 such as an Ethernet, WiFi, Internet, local network, wide area network, or similar connection.

The bus 41 allows data communication between the processor 44 and the storage/memory 43. The storage and/or memory generally includes the main memory into which an operating system and application programs are loaded. The storage also can contain, among other code, software which controls basic hardware operation of the system, such as interactions with peripheral components. Applications resident with the computer 20 are generally stored on and accessed via the storage 43. The storage 23 may be integral with the computer 40, or may be separate and accessed through other interfaces. The communication interface 45 may provide a direct connection to one or more remote computer systems via, for example, the Internet and/or wireless techniques such as WiFi, cellular connections, or the like. For example, the communication interface 45 may allow the computer to communicate with other computers via one or more local, wide-area, or other networks, such as illustrated in FIG. 5.

Many other devices or components (not shown) may be connected to the computer 40 in a similar manner (e.g., document scanners, digital cameras and so on). Additional components may be included in the computer system 40 as will be understood by one of skill in the art; conversely, all of the components shown in FIG. 5 need not be present to practice the invention. The components can be interconnected in different ways from that shown. The operation of a computer such as that shown in FIG. 5 is readily known in the art and is not discussed in detail in this application.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A computer-implemented method comprising:
obtaining an original representation of a form;
generating a predicted result representation of the form, the predicted result representation including a first mask that masks at least one region of the form;
obtaining an actual output representation of the form, the actual output representation being generated by a system configured to generate a version of the form automatically;
comparing the predicted result representation of the form to the actual output representation of the form excluding each masked region;
based upon the comparison, providing an identification of at least one inconsistency between the predicted result representation and the actual output representation of the form; and
generating an actual output representation to remove the inconsistency.

2. The method of claim 1, wherein the step of generating the predicted result representation of the form comprises:
generating a raw version of the original representation of the form; and
applying the first mask to the raw version.

3. The method of claim 2, wherein the raw representation is a bitmap.

4. The method of claim 2, wherein the mask identifies a portion of the predicted result representation of the form designed to receive dynamic data.

5. The method of claim 1, wherein the step of generating the actual output representation of the form comprises:
generating a raw version of the actual output representation.

6. The method of claim 5, wherein the raw version is a bitmap.

7. The method of claim 5, wherein the mask identifies a portion of the predicted result representation of the form that is not compared with the actual output representation of the form.

8. The method of claim 1, further comprising automatically revising an algorithm designed to generate the actual output representation to remove the inconsistency.

9. A system comprising:
a computer-readable storage storing an original representation of a form;
a processor configured to:
generate a predicted result representation of the form, the predicted result representation including a first mask that masks at least one region of the form;
obtain an actual output representation of the form, the actual output representation being generated by a system configured to generate a version of the form automatically;
compare the predicted result representation of the form to the actual output representation of the form excluding each masked region;
based upon the comparison, provide an identification of at least one inconsistency between the predicted result representation and the actual output representation of the form; and
generate an actual output representation to remove the inconsistency.

10. The system of claim 9, wherein the step of generating the predicted result representation of the form comprises:
generating a raw version of the original representation of the form; and
applying the first mask to the raw version.

11. The system of claim 10, wherein the raw representation is a bitmap.

12. The system of claim 10, wherein the mask identifies a portion of the predicted result representation of the form designed to receive dynamic data.

13. The system of claim 9, wherein the step of generating the actual output representation of the form comprises:
generating a raw version of the actual output representation.

14. The system of claim 13, wherein the raw version is a bitmap.

15. The system of claim 13, wherein the mask identifies a portion of the predicted result representation of the form that is not compared with the actual output representation of the form.

16. The system of claim 9, said processor further configured to revise an algorithm designed to generate the actual output representation to remove the inconsistency.

* * * * *